United States Patent Office 2,967,198
Patented Jan. 3, 1961

2,967,198
POLYNITROAMIDES

Milton B. Frankel, Pasadena, and Karl Klager, Monrovia, Calif., assignors to Aerojet-General Corporation, Azusa, Calif., a corporation of Ohio No Drawing. Filed Oct. 25, 1954, Ser. No. 464,611

16 Claims. (Cl. 260—561)

This invention relates to new compisitions of matter and a method for their preparation. In particular, this invention relates to polynitro diamides having the general formula:

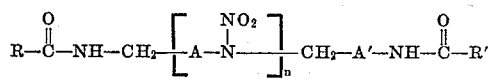

wherein R and R' are alkyl radicals, A and A' are alkylene radicals, and $n$ is a small whole number of from 1 to 4 inclusive.

Due to their high oxygen content, these compounds are excellent high explosives finding valuable use as the main explosive charge in shells, missiles, and blasting charges. They also find valuable use as oxygen donating additives and modifies for propellant fuels.

The compounds of this invention are prepared by condensing polynitro diamines with acid anhydrides, in accordance with the general reaction scheme set forth below:

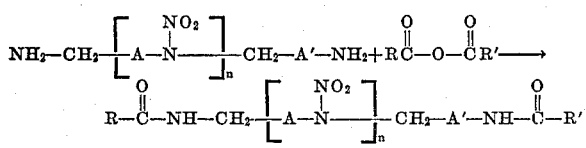

wherein R, R', A, A', and $n$ are as defined above.

The diamines useful as starting materials for this invention are obtained by reacting a nitraza diisocyanate with a strong mineral acid. The nitraza diisocyanates are prepared by reacting corresponding nitraza acid halides with sodium azide and heating under anhydrous conditions to effect rearrangement, as more fully disclosed in assignee's application Serial No. 438,294, filed June 21, 1954, now abandoned.

To more clearly illustrate this invention, the following examples are presented. It should be understood, however, that these examples are presented merely as a means of illustration, and are not intended to limit the scope of the invention in any way.

EXAMPLE I

*Preparation of N,N'-diacetyl-3,6-dinitraza-1,8-octane diamine*

A 1.4069 N solution of sodium methoxide in methanol (1.42.2 ml., 0.2 mole) was added dropwise with stirring to a suspension of 30.9 gm. (0.1 mole) of 3,6-dinitraza-1,8-octane diamine dihydrochloride in 75 ml. of methanol, at a temperature of from 0–5° C. The mixture was stirred for 30 minutes while maintaining the temperature at 0–5° C., and the precipitate of sodium chloride was removed by filtration and washed with methanol. The solution was concentrated in vacuo and diluted with 125 ml. of methylene dichloride. To this solution was added portionwise 30 ml. of acetic anhydride. A vigorous reaction occurred with a white solid separating. The reaction mixture was refluxed for one hour, cooled, and filtered. The yield was 29.8 gm. (93.2%), M.P. 178–180° C. Recrystallization from methanol did not raise the melting point. The elemental analysis of the product is as follows:

Calculated for $C_{10}H_{20}N_6O_6$: percent C, 37.49; percent H, 6.29; percent N, 26.24. Found: percent C, 38.25; percent H, 6.75; percent N, 25.80.

EXAMPLE II

*Preparation of N,N'-diacetyl-3-nitraza-1,5-pentane diamine*

A 1.4069 N solution of sodium methoxide in methanol (142.2 ml., 0.2 mole) was added dropwise with stirring at 0–5° C. to a suspension of 22.1 gm. (0.1 mole) of 3-nitraza-1,5-pentane diamine dihydrochloride and the precipitate of sodium chloride was removed by filtration and washed with methanol. The solution was concentrated in vacuo and diluted with 125 ml. of methylene dichloride. To this solution was added portionwise 30 ml. of acetic anhydride. A vigorous reaction occurred with a white solid precipitating. The reaction mixture was refluxed for one hour, cooled and filtered. The yield was 14.9 gm. (64.3%), M.P. 197–198° C. Recrystallization from methanol did not raise the melting point. The elemental analysis of the product is as follows:

Calculated for $C_8H_{16}N_4O_4$: percent C, 41.37; percent H, 6.95; percent N, 24.13. Found: percent C, 41.78; percent H, 6.97; percent N, 23.73.

We have also found that primary diamines such as 4-nitraza-1,7-heptane diamine and 4,7-dinitraza-1,10-decane diamine condense with a wide variety of acid anhydrides such as propanoic, butanoic, pentanoic and hexanoic anhydrides to produce the corresponding amides, such as N,N'-dihexanoyl-4-nitraza-1,7-pentane diamine, and N,N'-dipentanoyl-4,7-dinitraza-1,10-decane diamine. In addition, when a nitraza diamine such as 3-nitraza-1,5-pentane diamine is condensed with mixed anhydrides, such as a mixture of propanoic and butanoic anhydride, substituted amides such as N-propanoyl-N'-butanoyl-3-nitraza-1,5-pentane diamine, in which R and R' are different, are produced as well as the substituted amides in which R and R' are the same.

It is apparent that any member of the disclosed series of nitraza diamides may be prepared by merely selecting the appropriate primary diamine and reacting it with an acid anhydride, in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode an operation of an impact- or time fuse-mechanism firing a detonating explosive such as lead azide or mercury fulminate.

We claim:
1. As new compositions of matter, the nitraza diamides having the general formula:

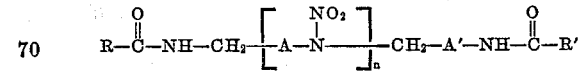

wherein R and R' are lower alkyl radicals, A and A' are lower alkylene radicals, and n is a small whole number of from 1 to 4 inclusive.

2. As new compositions of matter, the nitraza diamides having the general formula:

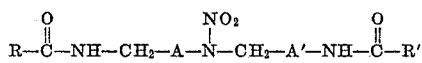

wherein R and R' are lower alkyl radicals and A and A' are lower alkylene radicals.

3. As new compositions of matter, the nitraza diamides having the general formula:

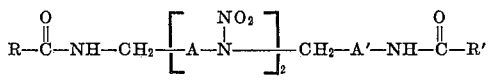

wherein R and R' are lower alkyl radicals and A and A' are lower alkylene radicals.

4. As a new composition of matter, N,N'-diacetyl-3-nitraza-1,5-pentane diamine having the structural formula:

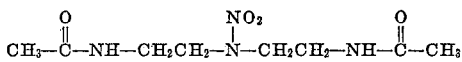

5. As a new composition of matter, N,N'-diacetyl-3,6-dinitraza-1,8-octane diamine having the structural formula:

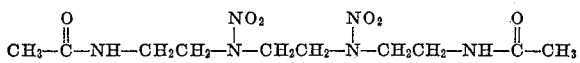

6. The method of preparing nitraza diamides having the general formula:

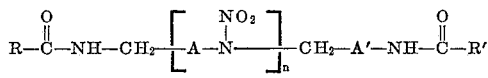

which comprises condensing alkanoic acid anhydride having the general formula:

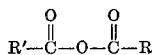

with a nitraza diamine having the general formula:

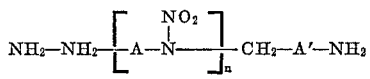

wherein R and R' are lower alkyl radicals, A and A' are lower alkylene radicals, and n is a small whole number of from 1 to 4 inclusive.

7. The method of claim 6 wherein the amine is produced in situ from the amine hydrohalide salt in the presence of an alkali metal alcoholate.

8. The method of preparing nitraza diamides having the general formula:

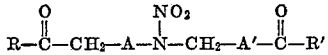

which comprises condensing an alkanoic acid anhydride having the general formula:

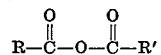

with a nitraza diamine having the general formula:

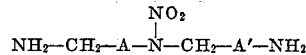

wherein R and R' are lower alkyl radicals and A and A' are lower alkylene radicals.

9. The method of preparing nitraza diamides having the general formula:

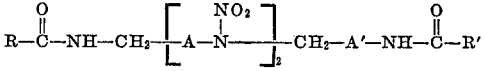

which comprises condensing an alkanoic acid anhydride having the general formula:

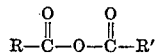

with a nitraza diamine having the general formula:

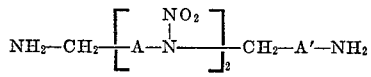

wherein R and R' are lower alkyl radicals and A and A' are lower alkylene radicals.

10. The method of preparing N,N'-diacetyl-3-nitraza-1,5-pentane diamine which comprises condensing 3-nitraza-1,5-pentane diamine with acetic anhydride.

11. The method of preparing N,N'-diacetyl-3,6-dinitraza-1,8-octane diamine which comprises condensing 3,6-dinitraza-1,8-octane diamine with acetic anhydride.

12. The method of preparing N,N'-diacetyl-3-nitraza-1,5-pentane diamine which comprises condensing 3-nitraza-1,5-pentane diamine hydrochloride with acetic anhydride in the presence of sodium methoxide.

13. The method of preparing N,N'-diacetyl-3,6-dinitraza-1,8-octane diamine hydrochloride which comprises condensing 3,6-dinitraza-1,8-octane diamine with acetic anhydride in the presence of sodium methoxide.

14. As a new composition of matter, N,N'-dihexanoyl-4-nitraza-1,7-pentane diamine having the structural formula:

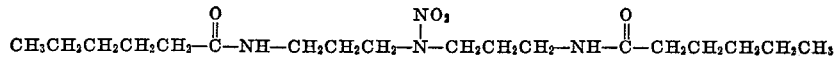

15. As a new composition of matter, N,N'-pentanoyl-4,7-dinitraza-1,10-decane diamine having the structural formula:

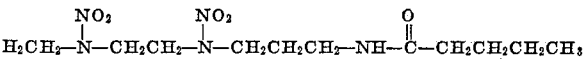

16. As a new composition of matter, N-propanoyl-N'-butanoyl-3-nitraza-1,5-pentane diamine having the structural formula:

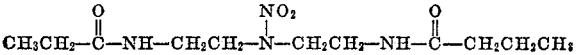

No references cited.